United States Patent [19]

Kanayama

[11] Patent Number: 4,460,906

[45] Date of Patent: Jul. 17, 1984

[54] INK JET HEAD WITH WELDED COMPONENTS

[75] Inventor: Yoshio Kanayama, Nabari, Japan

[73] Assignee: Sharp Kabushiki Kaisha, Osaka, Japan

[21] Appl. No.: 400,929

[22] Filed: Jul. 22, 1982

[30] Foreign Application Priority Data

Jul. 24, 1981 [JP] Japan ............................... 56-117000

[51] Int. Cl.$^3$ ............................................ G01D 15/18

[52] U.S. Cl. .................................. 346/140 R; 346/75

[58] Field of Search .............................. 346/75, 140 R

[56] References Cited

U.S. PATENT DOCUMENTS 4,229,751 10/1980 Tamai ............................ 346/140 R 4,364,066 12/1982 Koto .............................. 346/140 R

OTHER PUBLICATIONS

*Metals Handbook,* 8th Ed., vol. 6, p. 664, titled 'Welding and Brazing,' prepared by American Society for Metals.

*Primary Examiner*—E. A. Goldberg

*Assistant Examiner*—Gerald E. Preston

*Attorney, Agent, or Firm*—Birch, Stewart, Kolasch and Birch

[57] ABSTRACT

A printer head for use in an ink jet system printer of the ink on demand type includes a base plate, an oscillation plate to which a piezoelectric transducer is attached, a housing plate for defining a pressure chamber, a path plate and an orifice plate disposed in a stack-like fashion. These plates are welded to each other in order to ensure tight sealing. A nickel alloy is painted on each surface of the plates, and the stacked plates are placed in a high temperature (1050° C. through 1100° C.) for connecting the plates to each other by heat welding.

3 Claims, 3 Drawing Figures

INK JET HEAD WITH WELDED COMPONENTS

BACKGROUND AND SUMMARY OF THE INVENTION

The present invention relates to a printer head in an ink jet system printer of the ink on demand type.

Recently, an ink jet system printer of the ink on demand type has been practically developed, wherein ink droplets are emitted from a printer head at a desired time by suddenly reducing a volume of a pressure chamber included in the printer head.

A typical construction of an ink jet system printer of the ink on demand type is disclosed in U.S. Pat No. 3,747,120, "ARRANGEMENT OF WRITING MECHANISMS FOR WRITING ON PAPER WITH A COLORED LIQUID", issued July 17, 1973. Another example of the ink jet system printer of the ink on demand type is disclosed in U.S. Pat. No. 3,946,398, "METHOD AND APPARATUS FOR RECORDING WITH WRITING FLUIDS AND DROP PROJECTION MEANS THEREFOR", issued Mar. 23, 1976. In such an ink jet system printer of the ink on demand type, an accurate printing is not ensured when air bubbles are contained in ink liquid disposed in a pressure chamber of the printer head. The air bubbles are introduced into the ink liquid disposed in the pressure chamber due to an incomplete sealing of the printer head. The thus introduced air bubbles function to absorb the vibration energy supplied from a piezoelectric transducer attached to the pressure chamber, thereby precluding the accurate printing.

Accordingly, an object of the present invention is to provide a novel printer head which ensures an accurate printing in an ink jet system printer of the ink on demand type.

Another object of the present invention is to provide a novel fabrication method of a printer head for use in an ink jet system printer of the ink on demand type.

Still another object of the present invention is to provide a novel fabrication method of a printer head, which ensures a complete sealing of the printer head in an ink jet system printer of the ink on demand type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a printer head includes a base plate, a housing plate for defining a pressure chamber, an oscillation plate disposed at one side of the housing plate, and an orifice plate disposed at the other side of the housing plate. These plates are disposed in a stack-like fashion, and fixed to each other through the use of the welding method.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
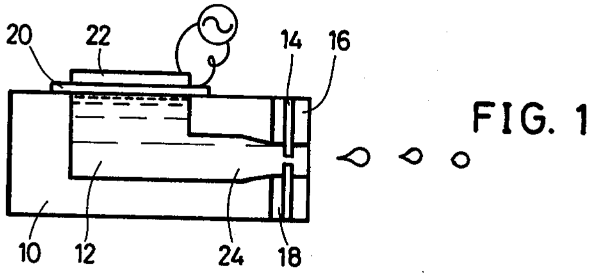
FIG. 1 is a schematic sectional view of a printer head of an ink jet system printer of the ink on demand type.

FIG. 1 schematically shows a basic construction of a printer head in an ink jet system printer of the ink on demand type. The printer head includes a housing 10 for defining a pressure chmber 12 in which ink liquid is disposed. At one end of the pressure chamber 12, an orifice plate 14 is provided, which is sandwiched between a slit plate 16 and a path plate 18. At the other end of the pressure chamber 12, an oscillation plate 20 is disposed, to which a piezoelectric transducer 22 is attached. A pulse voltage signal is applied to the piezoelectric transducer 22 in order to suddenly reduce the volume of the pressure chamber 12, whereby a portion of the ink liquid disposed in the pressure chamber 12 is emitted from the printer head through a passage 24, the path plate 18, the orifice plate 14 and the slit plate 16. The thus emitted ink liquid travels toward a recording paper as an ink droplet, thereby recording a desired symbol on the recording paper in a dot matrix fashion.

Generally, the droplet formation frequency in an ink jet system printer of the ink on demand type is low, and about 2 KHz. To achieve a high speed recording, a multi-head construction is employed, wherein a plurality of printer heads are aligned in the column direction. When, for example, seven (7) printer heads are aligned, and each of the printer heads has the droplet formation frequency of 2 KHz, the printing rate is 400 cps (characters per second, $2000 \div 5$) in cases where the character is formed in the $5 \times 7$ dot matrix fashion. The printing rate is 285 cps ($2000 \div 7$) when the space of $2 \times 7$ dot positions are provided between adjacent characters.

Figure 2:
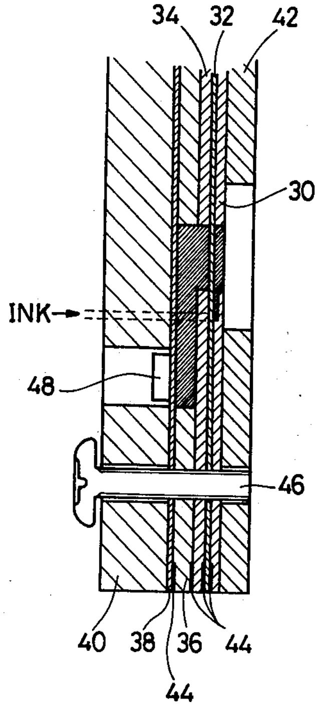
PRIOR ART FIG. 2
FIG. 2 is a sectional view of a printer head for explaining a fabrication method of the prior art.

FIG. 2 shows a construction of the printer head of the prior art. A slit plate 30, an orifice plate 32, a path plate 34, a housing plate 36 and an oscillation plate 38 are disposed in this order in a stack-like fashion, and sandwiched between a base plate 40 and a depression plate 42. The slit plate 30, the orifice plate 32, the path plate 34 and the housing plate 36 are shaped in a desired configuration through the use of etching techniques. The slit plate 30, the orifice plate 32, the path plate 34, the housing plate 36 and the oscillation plate 38 are fixed to each other by means of seal members 44, and these plates are tightly secured by the base plate 40 and the depression plate 42 through the use of screws 46. A piezoelectric transducer 48 is attached to the oscillation plate 38.

The printer head of the prior art shown in FIG. 2 is tightly fastened through the use of the screws 46. However, the sealing is not ensured by the screws 46, although the silicon sealing members are disposed between each of the plates. In this way, there is a possibility that air bubbles are introduced into the ink liquid due to the imcomplete sealing. Furthermore, the silicon sealing members affect the droplet formation characteristics such as the ink droplet emitting velocity, the droplet formation timing, and the droplet formation frequency. Moreover, the fabrication steps are complicated because of the provision of the silicon sealing members and the screws.

Figure 3:
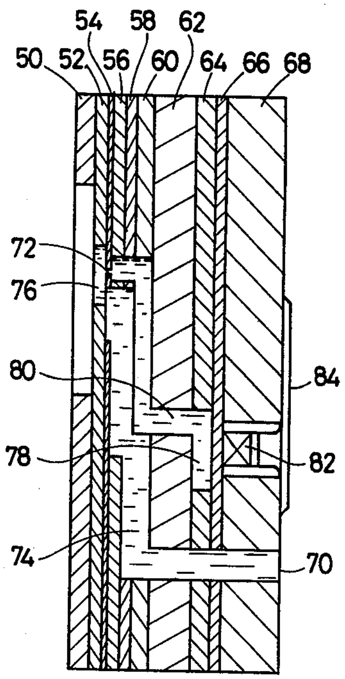
FIG. 3 is a sectional view of a printer head for explaining a fabrication method of the present invention.

FIG. 3 is a sectional view of an embodiment of a printer head of the present invention. The printer head of the present invention comprises a cover plate 50, a slit plate 52, an orifice plate 54, an under orifice plate 56, three path plates 58, 60 and 62, a housing plate 64 for defining the pressure chamber, an oscillation plate 66, and a base plate 68 disposed in the stack like fashion. The ink liquid is introduced into the printer head through an ink inlet 70 formed in the base plate 68, and the thus introduced ink liquid is fed toward an orifice 72 formed in the orifice plate 54 via an inlet path 74 formed in the path plates 58, 60 and 62. The ink liquid is filled in a slit aperture 76 formed in the slit plate 52 and a pressure chamber 78 defined by the housing plate 64, the pressure chamber 78 being communicated with the slit aperture 76 through a communication path 80 formed in the path plates 58, 60 and 62. A piezoelectric transducer 82 is secured to the oscillation plate 66 through the use of an adhesive. The piezoelectric transducer 82 is connected to a control system via a flexible substrate 84 which is secured to the base plate 68.

The piezoelectric transducer 82 is activated by a driving signal of, for example, 2 KHz in order to suddenly reduce the volume of the pressure chamber 78 by means of the movement of the oscillation plate 66. This sudden reduction of the volume of the pressure chamber 78 provides an ink droplet which is emitted from the orifice 72 and issues through the slit aperture 76 toward a record receiving paper.

Each of the plates 50, 52, 54, 56, 58, 60, 62, 64, 66 and 68 is made of a stainless steel plate SUS-304 determined by JIS-G-4303 (Japanese Industrial Standard). The cover plate 50 is shaped in a desired configuration through the use of a press method, and has a thickness of 0.4 mm. The slit plate 52 is shaped in a desired configuration through the use of a press method, and has a thickness of 0.3 mm. The orifice plate 54 is shaped in a desired configuration through the use of an etching method, and has a thickness of 0.05 mm. The under orifice plate 56 is shaped in a desired configuration through the use of a press method, and has a thickness of 0.2 mm. The path plates 58, 60 and 62 are shaped in desired configurations through the use of a press method, and have a thickness of 0.2 mm, 0.4 mm and 1 mm, respectively. The housing plate 64 is shaped in a desired configuration through the use of a press method, and has a thickness of 0.4 mm. The oscillation plate 66 is shaped in a desired configuration through the use of a press method, and has a thickness of 0.2 mm. The base plate 68 is shaped in a desired configuration through the use of a press method, and has a thickness of 2 mm.

A liquid phase nickel alloy is painted on the surfaces of the ten plates 50 through 68, and these ten (10) plates 50 through 68 are disposed on each other in stack-like fashion in the order shown in FIG. 3. Then, these ten (10) plates are secured by a fastening tool and disposed in a high temperature chamber (1050° C. through 1100° C.), whereby the plates are tightly connected to each other by welding. The tight connection is ensured because the connection is achieved by the welding of the nickel alloy and the stainless steel. After formation of the welded plates, the piezoelectric transducer 82 is secured to the oscillation plate 66 by means of the adhesive, and the flexible substrate 84 is secured to the base plate 68 by means of the adhesive.

The ink liquid is not damaged, and the welded portion is not damaged even when the printer head formed by the above method is disposed in the ink liquid of 50° C. for three months.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system ink on demand a print head which comprises a pressure chamber of which one end is provided with an orifice means for emitting ink droplets therethrough, and the other end is connected to an electro-mechanical transducer for suddenly reducing the volume of said pressure chamber, said print head comprising:

- a base plate;
- an oscillation plate secured to said base plate, said electro-mechanical transducer being attached to said oscillation plate;
- a housing plate welded to said oscillation plate, said housing plate defining said pressure chamber;
- a plurality of path plates disposed in a stack-like fashion and welded to each other, one surface of said stacked plurality of path plates being welded to said housing plate; and
- an orifice plate welded to the other surface of said stacked plurality of path plates.

2. The ink jet system print head of claim 1, which further comprises:

- a slit plate welded to said orifice plate.

3. The ink jet system print head of claim 1 or 2, wherein:

- said plates are heat-welded with nickel alloy therebetween.

* * * * *